Dec. 16, 1969     W. K. HOLZER     3,484,568

PROGRAM CONTROL MECHANISM, PARTICULARLY FOR WASHING MACHINES

Filed Sept. 22, 1966     2 Sheets-Sheet 1

INVENTOR
WALTER K. HOLZER

BY *Kenwood Ross*

ATTORNEY

Dec. 16, 1969    W. K. HOLZER    3,484,568
PROGRAM CONTROL MECHANISM, PARTICULARLY FOR WASHING MACHINES
Filed Sept. 22, 1966    2 Sheets-Sheet 2

INVENTOR

WALTER K. HOLZER

BY    *Kenwood Ross*

ATTORNEY

# United States Patent Office 3,484,568
Patented Dec. 16, 1969

3,484,568
PROGRAM CONTROL MECHANISM, PARTICU-
LARLY FOR WASHING MACHINES
Walter K. Holzer, Drosteweg 19, Meersburg
(Bodensee), Germany
Filed Sept. 22, 1966, Ser. No. 581,236
Claims priority, application Germany, Oct. 8, 1965,
H 57,365
Int. Cl. H01h 7/08, 43/10
U.S. Cl. 200—38         11 Claims

ABSTRACT OF THE DISCLOSURE

A program control mechanism comprising a timing generator having a plurality of output terminals and delivering successive switching pulses in fixed timed intervals from the output terminals, a number of multiple-stage switches having several input terminals individually connected to the output terminals of the timing generator, with each program switch associated with a certain program function so that each program switch as a function of the input pulses effects the switching on of a switching or operational process of the program and whereby each of the program switches is individually adjustable by hand in order to select a certain time pulse of a certain output terminal of the timing generator according to the desired program operation.

---

The present invention relates to a program control mechanism, particularly for washing machines, with a timing generator, program contacts, and a number of selector switches of multiple-stage form.

It is the principal object of the invention to provide an improved control mechanism in which a clearly observed selection of programs, capable of manifold variation, is provided by simple means.

The hitherto known control mechanisms for the automatic programming of washing machines are in many respects disadvantageous. For example, control mechanisms have been known which contain a moving control cam which is scanned by a follower-arm. The correct operation of such a control mechanism is not entirely simple; it requires considerable attention and also a degree of expert knowledge on the part of the user. Furthermore, the clarity of the setting made leaves much to be desired. Too, in the case of program selector switches with key-operated controls, it is disadvantageous that one should have to provide for each individual alternative of a program a respective operating key, which finds its limits in practice, due to the economy of production and of fitment of the mechanism. Programs which can be selected by means of push-button switches are for this reason relatively rigid. Other known program control devices offer possibilities in that exchangeable key-plates embodying holes or notches, arranged differently according to the particular program required, are provided, but even here, an individual adaptation of the desired washing program is not possible. The selection of the suitable cam requires a certain material knowledge which need not necessarily be present in the layman.

Also known is an arrangement, in program selector switches of electric washing machines, by means of which individual portions of program can, by pre-selection, be overrun or omitted. In this case, an electromechanical timing generator is provided which controls a step-by-step mechanism which actuates the program contacts with the desired time duration. With this arrangement, too, however, pre-selection of the program is not very clear.

It is therefore another object of the invention to avoid the disadvantages of the known art and to provide a device which is of simple design, can be economically produced, and is readily suitable for clearly-observed program selection.

In accordance with the invention, the prior art problems are resolved in that a timing generator is adapted to give out a multiplicity of fixed, staged time signals which are associated with coded positions of the stage switches for the individual portions of the program, the desired time stages for whatever portion of program is to be adjusted being pre-selectable by the relevant stage switches. For the particular portion of program which is to be set, therefore, the multiple-stage switches are set at positions which are clearly marked by code numbers, and the duration of a portion of program is established by fixed, staged timing signals from the timing generator. Accordingly, the adjustment is extremely simple to carry out and is immediately visible by reading off the pre-set code numbers.

The essential feature of the invention is that the time basis for the various portions of the washing program is individually adjustable, it being possible to use either an electromechanical or an electronic timing generator.

It is envisaged, herein, that both the timing generator and the stage switches be disposed on a common conductor plate so as to ensure a particularly simple and clear construction of the program control mechanism. The arrangement both of the timing generator and of the selection system and of the associated program contacts on a common conductor plate permits of extremely economical production, convenient assembly and maintenance, and an increased functional reliability, since additional fixing and electric elements are unnecessary and the individual elements of the program control mechanism can be connected in a vibration-free manner.

One salient feature of the invention provides for the timing generator to be constructed in the form of an electromechanical system consisting of a continuous drive located underneath the conductor plate, with a reduction gearing, one rotating collector arm on each side of the conductor plate and, located above it, a step-by-step mechanism.

Such a timing generator represents an improvement over prior art structures in that both sides of the conductor plate are used, namely the underside for the time graduation and the top side for the step graduation, While this arrangement offers spatial and production advantages, it permits the use, in unmodified form, of a known timing generator.

It is furthermore expedient, in this invention, that the timing generator have, in per se known manner, a starting position into which the timing collector arm is guided by an adjusting arrangement after each step has been completed. Thus, it is ensured that the individual steps always start from the same starting position, an important feature because the step-by-step mechanism has a drive which is relatively fast as compared with the timing system.

According to a further feature of the invention, the adjuting arrangement consists of a per se known override coupling or return ratchet which, when the timing collector arm is reached, entrains this latter by means of a projecting lug.

While, in itself, a return of the timing collector arm to its starting position would be possible, it is advantageous, in order to avoid uneven wear on the printed switch paths, for the timing collector arm to be driven in its direction of rotation so that under certain circumstances, even a shorter cycling time may result. That is, if the individual programs or portions of programs predominantly require prolonged durations, the timing collector arm in each case completes more than half of one rotation.

Another important feature of the invention provides for the electrical connections between the timing generator and the stage switches to be in the form of non-crossing conductors on the conductor plate. This measure makes it entirely possible, in practice, to avoid loose connecting wires and further to reduce production expense and to increase functional safety.

In this connection, it is important that switch contacts of the same code number on the stage switches each be connected by one conductor and that no more than one conductor be passed between any two switch contacts of a stage switch.

Such arrangement makes it possible to manage with a minimum number of connections which, furthermore, occupy the minimum of distance. Manufacture, assembly and maintenance or servicing are consequently simplified.

Furthermore, it is expedient for the conductors in the region of the stage switches to be guided in the form of segments concentric with the switch axis, all so as to contribute toward achieving the shortest possible conductor distances. Of course, it would also be possible to construct the conductors in the region of the switch axis, in the form of straight, multi-angularly adjacent printed conductor paths. The concentric segments, however, offer the advantage of improved clarity.

In the invention, as exemplified, a per se known override contact is provided on each stage switch. Consequently, one has the option of entirely omitting individual operations by turning the relevant stage switch to the override position. This is particularly advantageous if, for example, prewashing or one spinning process is not required.

A further feature of the invention allows the timing generator and step-by-step mechanism to be driven in per se known manner by a slide armature motor.

Also, in the case of the timing generator which is included in the construction of the printed conductor plate, it is possible to function with one single drive motor having two different working positions, driving the electromechanical timing system with one and the step-by-step mechanism with the other. The drive spindle may, for example, be guided inside concentric hollow shafts connected with each one of the two rotating collector arms beneath or above the conductor plate, as the case may be.

Further features and advantages of the invention will appear from a reading of the following description of one embodiment of the invention in which reference to the accompanying drawings is made, wherein.

Figure 3:
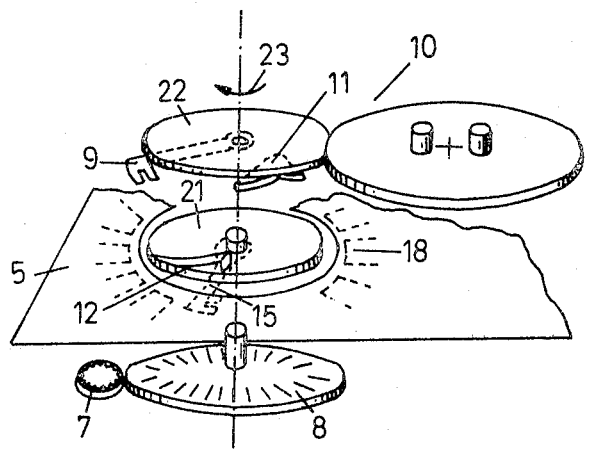
Figure 4:
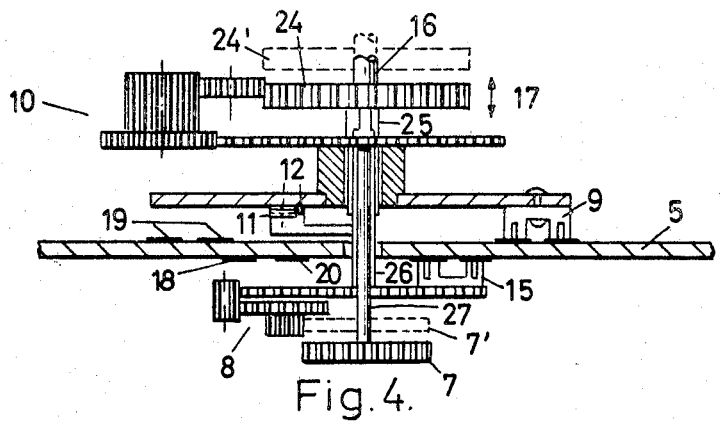

FIG. 3 diagrammatically shows the construction of a timing generator for a program control mechanism according to the invention; and FIG. 4 shows a cross-section through another diagrammatically-represented timing generator on the printed conductor plate.

Figure 1:
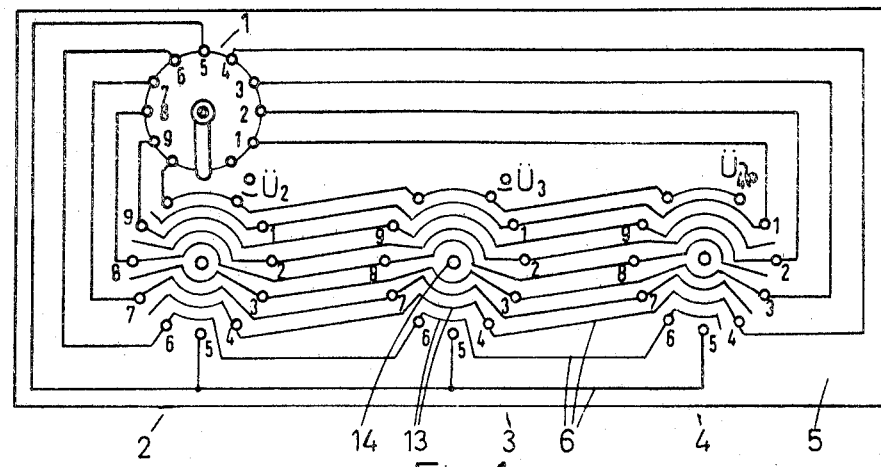
FIG. 1 shows a program control mechanism disposed on a printed conductor plate according to the invention.

In the drawings, the program control mechanism according to the invention is shown in diagrammatic form. FIG. 1 shows a printed conductor plate 5 on which a timing generator 1 and three stage switches 2, 3, 4 are arranged.

The functioning of the program control mechanism according to the invention is most clearly seen from the wiring diagram (FIG. 2) wherein are shown stage switches 2, 3 and 4, in different switching positions. By way of illustration, stage switch 2 is in position 4, stage switch 3 is in position 6, and stage switch 4 is in position 3. From this numbering, the operator immediately sees the code number 463. The significance of this code number can be ascertained by reference to a table in which the individual washing programs are listed. Such a table can be worked out by the user himself on the basis of practical experience or may be proposed by the manufacturer for the various products which are to be washed.

Figure 2:
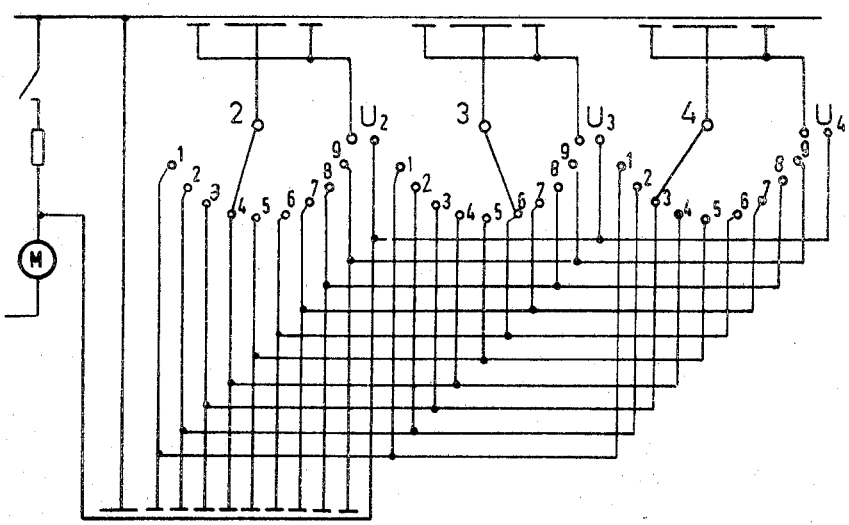
FIG. 2 is the wiring diagram of the arrangement of FIG. 1.

As can also be seen from FIG. 2, individual contacts 1 to 9 and Ü of each individual stage switch are connected inter se and with timing generator 1. This ensures that the program portions pre-selected by adjustment of the stage switches are in operation for a period controlled by timing generator 1. It is expedient for each individual stage switch to correspond to a certain operation, for example stage switch 2 to the washing process, stage switch 3 to the rinse process, and stage switch 4 to the spin process. Further, stage switches could possibly be provided for a preliminary wash and for drying.

FIG. 2 also shows that the drive motor M acts not only on timing generator 1 but also on the step-by-step mechanism 10. Furthermore, it is shown that drive motor M can also be set in motion directly through a contact and a resistance.

FIG. 3 shows, diagrammatically, one possible construction of timing generator 1 for a program control mechanism, according to the teachings of the invention. Beneath printed conductor plate 5 is a drive 7 with a reduction gearing 8 for the timing system. This consists of a rotating collector arm 15 which wipes over time graduation contact segments 18 disposed underneath the conductor plate. The collector arm 15 is connected rigidly to a disc 21 on which there is a projection 12. On the top of the printed conductor plate 5 is the step graduation, not shown, which is in wiping contact with collector arm 9 of step mechanism 10. Step mechanism 10 is driven substantially more quickly than is the timing system. On a disc 22 of step mechanism 10, connected to collector arm 9 is a return detent 11 which, in its direction of rotation 23, encounters the projection 12 and so drives disc 21 and collector arm 15 which is connected therewith. A break in the switching path of the step graduation, not shown, ensures that the drive of step mechanism 10 is interrupted in a certain position of collector arm 9, so that collector arm 9 and collector arm 15 are in their starting positions. In the subsequent portion of the program, when the next segment of timing graduation 18 is reached by collector arm 15, the drive of step mechanism 10 will again be engaged. This runs until return detent 11 has, by means of projection 12, turned collector arm 15 back to its starting position. The time taken by collector arm 15 to move from this starting position until it reaches the individual segments of time graduation 18 determines the intervals between the switching steps.

While in the embodiment according to FIG. 3, separate motors may be provided for drive 7 of the timing system and the drive of step mechanism 10, only one sliding armature motor is needed in the embodiment shown in FIG. 4. Without consideration of the actual reduction ratios, this figure shows how spindle 16 of the sliding anchor motor (not shown), which is displaceable in the direction of the arrow 17, is rigidly connected to a gearwheel 24 of step mechanism 10 and driving wheel 7 of the timing system. Also connected to the gearwheel 24 is a hollow shaft 25 which engages over the hollow shaft 26 mounted on collector arm 15. In the hollow shaft 26 is the spindle 27 of driving wheel 7. Mounted on outer hollow shaft 25 is the driving wheel for collector arm 9. In the position as shown in the drawing, gearwheel 24 drives collector arm 9 through a transmission. Collector arm 9 is provided with a return detent 11 which, when it strikes projection 12 associated with hollow shaft 26, entrains collector arm 15. Provided in the switching paths 19 of step mechanism 10 is an interruption, the effect of which is to switch the sliding armature motor into its other working position. Drive wheel 24 therefore assumes the position 24' shown in broken lines and is therefore disengaged, while drive wheel 7 of the timing mechanism now engages in reduction gearing 8 and so moves collector arm 15 onto the next segment of timing graduation 18. Here, again, the first working position of the sliding armature motor is engaged, so that step mechanism 10 operates. This alternation occurs in the rhythm which has been fixed by the pre-selection of the energized time graduation segments, when stage switches 2, 3 and 4 were adjusted. Automatic program cycling is therefore ensured. The maximum freedom is allowed for the variation of possible programs.

Even though the invention has been explained with reference to the aforesaid embodiments, it must be explained that the basic idea of the invention can be carried out structurally in a variety of ways. Therefore, it is possible to describe as the application of the invention all those possibilities in which stage switches serving for pre-selection of program portions and identified by code numbers cooperate with a timing generator which is adapted to furnish a plurality of fixed staged time signals and which is preferably constructed on a printed conductor plate which also carries the stage switches and the associated connections or contacts.

I claim:

1. A program control mechanism comprising: a timing generator having a plurality of output terminals and delivering successive switching pulses in fixed timed intervals from these output terminals, and a number of multi-stage switches having several input terminals individually connected to the output terminals of the timing generator, which each program switch associated with a certain program function so that each program switch as a function of the input pulses effects the switching on of a switching process of the program and whereby each program switch is individually adjustable by hand in order to select a certain time pulse of a certain output terminal of the timing generator according to a desired program operation.

2. A program control mechanism according to claim 1, wherein the output terminals of the timing generator and the input terminals of the multi-stage switches are disposed on a common conductor plate and connected with each other by printed circuits.

3. A program control mechanism according to claim 1, wherein the multi-stage switches have at least the same number of input terminals as the timing generator has output terminals and each input terminal of each program switch is connected to the associated input terminal of each program switch as well as to the corresponding output terminal of the timing generator.

4. A program control mechanism according to claim 1, wherein the output terminals of the timing generator include contact segments spaced from each other and the output terminals are cooperating with a rotary collector arm driven at a preselected speed by an electric motor.

5. A program control mechanism according to claim 1, including a positioning arrangement for returning the timing generator to its zero-position after completion of each segment of the program.

6. A program control mechanism according to claim 4 wherein a return mechanism returns the collector arm in normal direction of rotation to its zero-position.

7. A program control mechanism according to claim 6, wherein the return mechanism includes a rotary arm arranged in such manner that it is driven with a speed being greater than the pre-set rotary speed of the collector arm of the timing generator and the rotary arm is engaging the collector arm as their tracks of travel correspond in order to drive the collector arm with increased speed and to return the latter to its zero-position.

8. A program control mechanism according to claim 5 provided with means which stop the drive of the timing generator at the end of each segment of the program and start the drive of a positioning mechanism and being provided with means for stopping the drive of the positioning mechanism and starting the drive of the timing generator when the latter has reached its zero-position.

9. A program control mechanism according to claim 8, wherein the positioning mechanism and the timing generator are arranged in such manner as to be alternatively driven by the same motor.

10. A program control mechanism according to claim 9, wherein the motor is a sliding armature motor which, depending on the position of the sliding armature, is driving the positioning mechanism and the timing generator over gearing with the respectively required speeds.

11. A program control mechanism according to claim 5, wherein a positioning mechanism is arranged on one side of a conductor plate, on the opposite side of which the timing generator and the multi-stage switches are mounted.

References Cited

UNITED STATES PATENTS 3,109,073  10/1963  Lewis et al. _____ 200—38

FOREIGN PATENTS 204,115  6/1959  Austria.
905,504  3/1954  Germany.

HERMAN O. JONES, Primary Examiner